United States Patent
Sobel et al.

(10) Patent No.: US 6,320,593 B1
(45) Date of Patent: Nov. 20, 2001

(54) METHOD OF FAST BI-CUBIC INTERPOLATION OF IMAGE INFORMATION

(75) Inventors: Arthur Sobel, Los Altos Hills; Todd S. Sachs, Menlo Park, both of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/296,194

(22) Filed: Apr. 20, 1999

(51) Int. Cl.[7] .............................. G09G 5/04; H04N 3/14; H04N 5/202; G06K 9/38
(52) U.S. Cl. .......................... 345/600; 348/272; 348/254; 382/272
(58) Field of Search ..................................... 345/153, 155, 345/137, 138, 431; 348/222–225, 272–280, 242; 382/272, 167; 358/513, 514

(56) References Cited

U.S. PATENT DOCUMENTS

| | | | | |
|---|---|---|---|---|
| 4,591,902 | * | 5/1986 | Masubuchi | 348/791 |
| 4,771,279 | * | 9/1988 | Hannah | 345/197 |
| 4,945,406 | * | 7/1990 | Cok | 358/506 |
| 4,988,984 | * | 1/1991 | Gonzalez-Lopez | 345/132 |
| 5,008,739 | * | 4/1991 | D'Luna et al | 348/254 |
| 5,319,451 | * | 6/1994 | Sasaki et al. | 348/282 |
| 5,319,750 | * | 6/1994 | Matsuo et al. | 345/501 |
| 5,349,451 | * | 9/1994 | Dethardt | 358/451 |
| 5,418,565 | * | 5/1995 | Smith | 348/273 |
| 5,428,465 | * | 6/1995 | Kanamori et al. | 358/518 |
| 5,438,364 | * | 8/1995 | Maeshima et al. | 348/223 |
| 5,444,483 | * | 8/1995 | Maeda | 34/231 |
| 5,552,827 | * | 9/1996 | Maenaka et al. | 348/266 |
| 5,568,596 | * | 10/1996 | Cawley | 345/431 |
| 5,572,235 | * | 11/1996 | Mical et al. | 345/150 |
| 5,581,298 | * | 12/1996 | Sasaki et al. | 348/222 |
| 5,659,406 | * | 8/1997 | Imao et al. | 358/518 |
| 5,778,106 | * | 7/1998 | Juenger et al. | 382/275 |
| 5,828,406 | * | 10/1998 | Parulski et al. | 348/220 |
| 5,852,468 | * | 12/1998 | Okada | 348/272 |
| 5,901,242 | * | 5/1999 | Crane et al. | 382/166 |
| 5,930,407 | * | 7/1999 | Jensen | 382/300 |
| 6,130,960 | * | 10/2000 | Acharya | 382/167 |

OTHER PUBLICATIONS

"On the Comparison of Interpolation Methods", E. Maeland, IEEE Transactions on Medical Imaging, vol. 7, No. 3, Sep. 1988.*

"Design of Practical Color Filter Array Interpolation Algorithms for Digital Cameras", J. Adams. Jr., Image Processing, 1998, ICIP 98. Proceedings. 1998 International Conference, vol. 1, 1998.*

Parker, J. Anthony, et al., "Comparison of Interpolating Methods for Image Resampling", IEEE Transactions in Medical Imaging, vol. MI–2, No. 1, Mar., 1983.

* cited by examiner

*Primary Examiner*—Jeffery Brier
*Assistant Examiner*—Ryan Yang (57) ABSTRACT

A method for interpolating a first color value associated with a first color and a second color value associated with a second color for use in generating a pixel that represents a portion of a digital image, based on a third color value that is associated with a third color. A first matrix is created and stored, comprising first coefficient values that are associated with a other values of the first color for pixels that surround the current pixel of interest. A second matrix is stored that holds second coefficient values that are associated with a second color value. Each of the first coefficient values is bitwise shifted by a pre-determined power of 2. The first color value is created and stored by applying the first coefficient values to the other values of the first color using a bitwise shift operation. The first color value is bitwise shifted by a complement of the pre-determined power of 2. As a result, a complete set of pixel values having three color values (such as Red, Green, and Blue) are created and may be used in displaying the digital image.

6 Claims, 7 Drawing Sheets

METHOD OF FAST BI-CUBIC INTERPOLATION OF IMAGE INFORMATION

FIELD OF THE INVENTION

The present invention generally relates to computer graphics. The invention relates more specifically to a method and apparatus for interpolating color information in a computer-generated graphical image.

BACKGROUND OF THE INVENTION

Color display devices that are used by computers and by computer-related devices such as digital cameras, generally comprise a two-dimensional matrix of display elements or pixels. Each pixel comprises a Red ("R"), Green ("G"), and Blue ("B") cell. Each display device cell is represented by a corresponding memory cell that may store a numeric value. The memory cell values usually are 8, 10, or 12 bits in size, and may be stored in any other convenient size. A computer program may cause a particular pixel to glow in any visible color, or to appear black or white, by setting the numeric values of its red, green, and blue cells to an appropriate value.

In many products and applications, some of the pixel information is generated or "interpolated" by a computer processor or CPU based on other information. Within the general field of computer graphics displays, there is an acute need to improve the way that displays generate or interpolate missing color information. In products that use display devices that are driven by a sensor, there is a particular need to improve the methods and mechanisms that are used to generate interpolated color information.

The following description will focus on particular problems encountered with digital cameras that use CCD sensors to receive light and form a digital picture for display by a color LCD display of the camera. However, the problems described herein occur in many other contexts, and the solutions described herein are applicable to such contexts. For example, the problems and solutions described herein are applicable to all color area sensors that use a two-dimensional array of sensing elements.

Generally, when a digital camera CPU receives image information from the camera sensor, each pixel provided by the sensor represents only one optical color, usually Red, Blue, or Green. The pixels are arranged in and arrive in a pattern, which corresponds to the physical placement of sensing elements in the sensor. In one pattern, a first line of the sensor has alternating Red and Green pixels, and the next line has alternating Green and Blue pixels. The pattern continues for the entire CCD sensor, which has a checkerboard or mosaic pattern.

Figure 5:
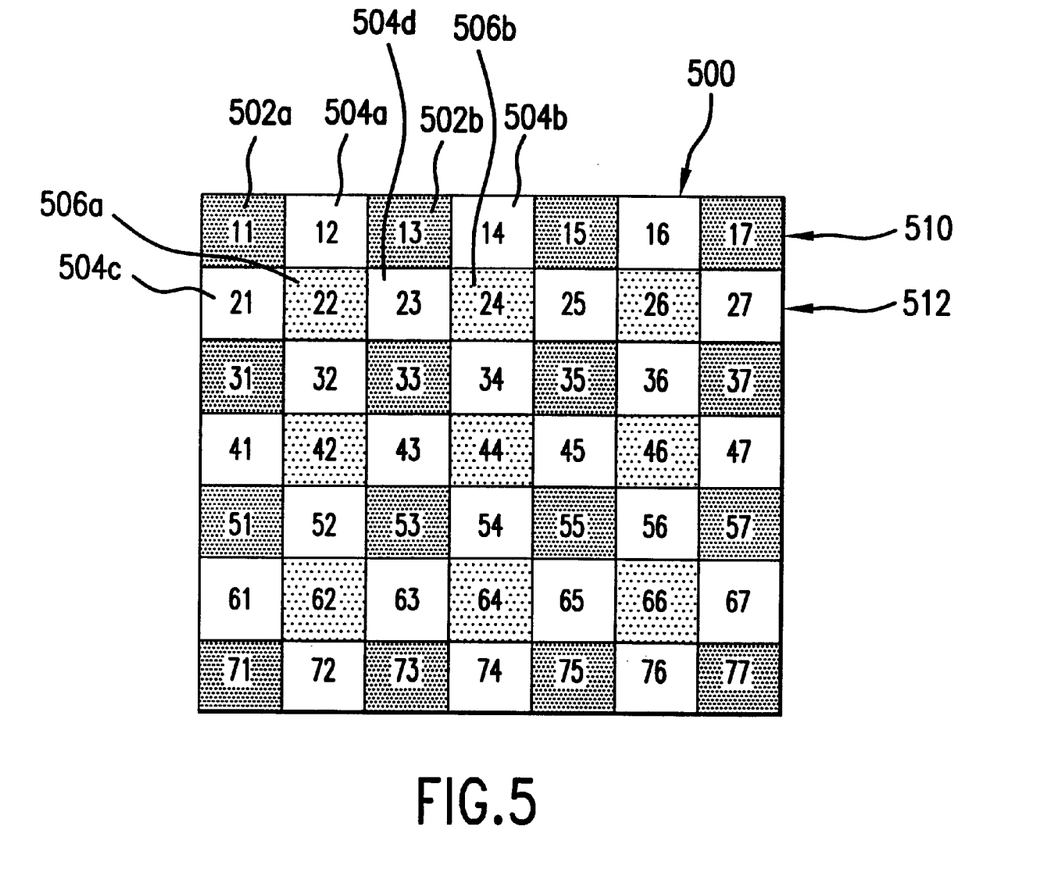
FIG. 5 is a diagram that schematically illustrates a color pixel pattern of an example sensor device.

FIG. 5 is a block diagram of a 7-by-7 portion 500 of sensor elements 502, 504, 506 that illustrates one pattern that is used by some CCD sensors. A first line 510 of portion 500 comprises a first Red pixel 502a, a first Green pixel 504a, a second Red pixel 502b, a second Green pixel 504b, and so on in an alternating pattern. Second line 512 of portion 500 has a first Green pixel 504c, a first Blue pixel 506a, a second Green pixel 504d, a second Blue pixel 506b, and so forth. This two-line pattern is repeated across the entire surface of the sensor. When the sensor delivers pixel information to a CPU or other element, the information arrives in the same pattern.

Each pixel value may be an 8-bit quantity, 10-bit quantity, 12-bit quantity, or a numeric quantity of some other size. For convenience, in FIG. 5 each pixel is labeled with a numeral from 11 to 77 that identifies its relative position in the 7-by-7 portion 500.

In the foregoing pattern, there are twice as many Green pixels as there are Blue pixels or Red pixels. This is done because the human eye has been found to perceive Green as the most important color in an image, and also because the semiconductor materials that are used to form the sensors are less sensitive to light of Green wavelengths.

The pixel information receive using this checkerboard pattern, however, cannot be directly displayed on a graphic display device. An image may be produced only by adding further pixel information to the pattern of pixel information. Each element of the display comprises the combination of a Red, Green, and Blue pixel and corresponding pixel value, however, each element of the sensor represents only one of the three colors. Thus, two additional complementary color values must be generated and stored in association with the single color value received from the sensor.

For example, in the first line of the portion 500 of FIG. 5, for the first Red pixel 502a, Green and Blue color values must be created and stored. For the next pixel, which is Green pixel 504a, a Red value and a Blue value must be created and stored. This process is called "color interpolation" and must be rapidly carried out for every pixel value that is received from the sensor. An image may be displayed only after the interpolation step is complete.

Several past approaches are known for carrying out color interpolation. For example, bilinear interpolation involves an averaging approach. At each Blue pixel, to interpolate the Green value, the surrounding four (4) Green values actually received from the sensor are obtained, and their arithmetic mean is computed. The mean value becomes the interpolated Green value. This approach is simple, but relatively inaccurate in terms of color fidelity and image appearance.

A more accurate prior approach is bicubic color interpolation. Bicubic interpolation is similar to bilinear interpolation, but involves using more neighboring pixels and applying a computation that is more complex than averaging.

In one approach, the computation considers a 7-by-7 matrix of pixels, in which the pixel for which interpolation is carried out lies at the center of the matrix, and the computation considers three (3) neighbor pixels in each linear direction. For example, the matrix of FIG. 5 may be used. In this example, Blue pixel 41 is the center pixel for which interpolation is carried out and all other pixels illustrated in FIG. 5 are neighbors. In this approach, a corresponding matrix of coefficient values is defined and stored. Each coefficient has a floating-point value between "0" and "1". Each coefficient value is defined by a non-linear curve that reflects the relative contribution of each neighbor pixel to the complementary color values of the center pixel. Each coefficient value of all neighbor pixels of a particular color is multiplied by the value of the center pixel, then all the products are summed, and then the arithmetic mean of the products is taken. The result is the pixel value for that particular color.

Figure 6:
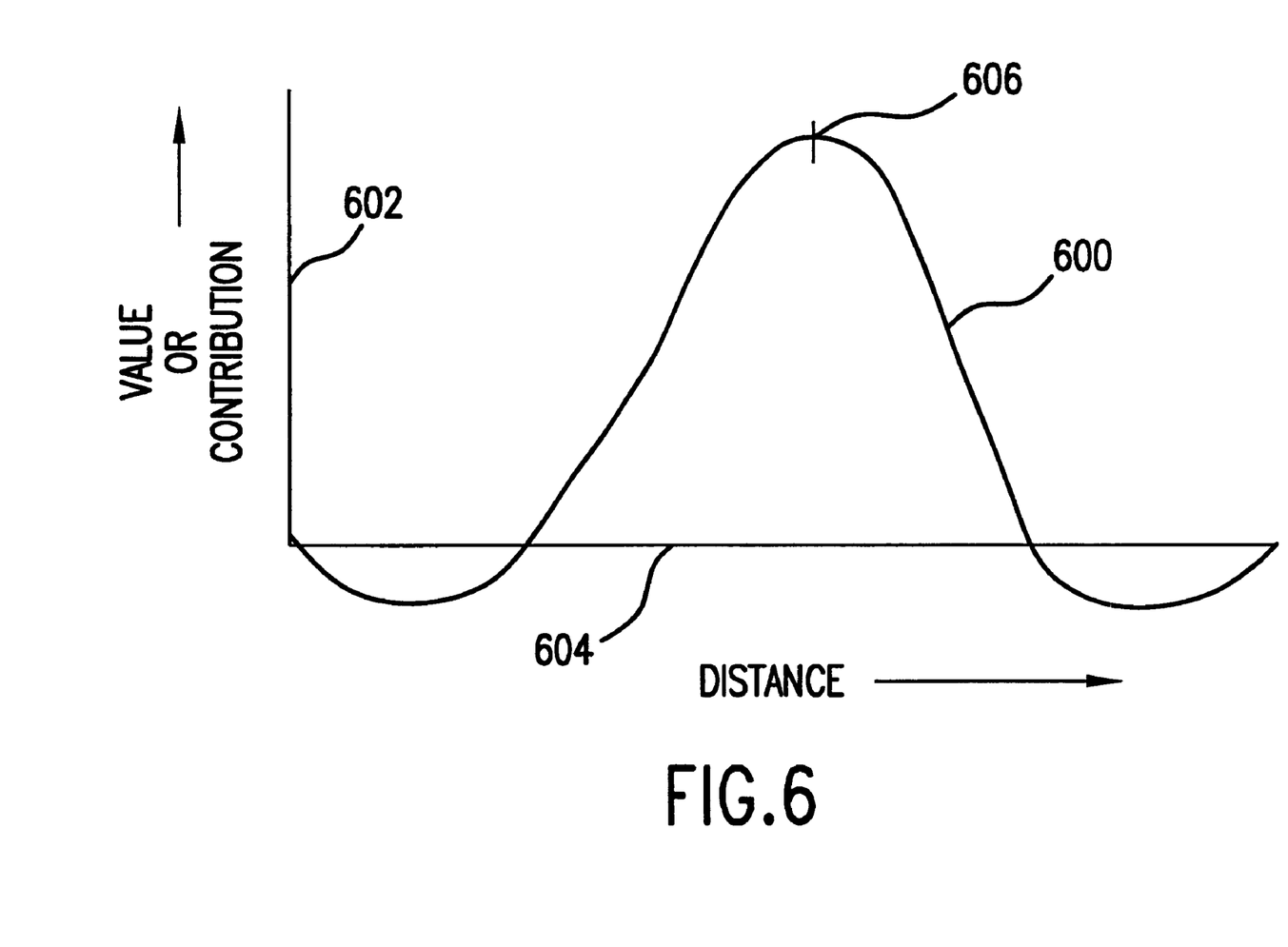
FIG. 6 is a graph of relative contributions of neighbor pixels.

FIG. 6 is a graph of one possible curve 600 of one line of the coefficient values. Vertical axis 602 represents the relative contribution of a particular pixel and therefore the magnitude of the coefficient. Horizontal axis 604 represents distance from the center pixel 41. Thus, generally, coefficient values decrease in a non-linear manner with increasing distance from the center pixel. In an embodiment, curve 600 is applied to a finite number of discrete coefficient values, such as seven, so that not all possible values of curve 600 are represented in the stored coefficients.

This approach has a significant disadvantage, namely that it is very computationally intensive. Referring to FIG. 5, assume that a bicubic interpolation process is executing, and that Blue pixel 41 is the pixel for which interpolation is currently being performed. Blue pixel 41 has twenty-four (24) non-zero Green neighbor pixels. Each Green neighbor pixel is associated with a co-efficient value having a value between "0" and "1". Thus, the approach would require considering 24 non-zero Green neighbor values and 24 associated coefficients.

Accordingly, this would require a CPU to perform 24 floating-point multiply operations to compute the contribution of each coefficient, and 23 add operations to yield a value for the Green color. The CPU would then have to compute the Red value. For Red and Green, a total of 40 floating-point multiplies and 30 adds are required. If the entire CCD sensor has 6 million pixels, this approach may take 10–12 seconds to carry out, which is unacceptably long. Thus, this approach is computationally too intensive for current microprocessors, especially when executed by the processors of the type now used in digital cameras and similar devices.

Other past approaches are described in J. A. Parker et al., "Comparison of Interpolating Methods for Image Resampling," MI-2 IEEE Transactions on Medical Imaging 31 (March 1983).

A related problem involves processing image data that is delivered serially from the sensor to a processor, for example the CPU of a digital camera.

A typical CCD camera sensor comprises an array of CCD sensors arranged in rows and columns. Between each column of CCDs there is a vertical shift register. At the bottom of all the columns is a horizontal shift register. When an image is formed by opening the shutter of the camera, each sensor in the array, which represents a pixel, is exposed for a length of time that is determined by a sensor controller. Then, information produced by all the sensors is transferred to the vertical shift registers. The information is then transferred, one pixel value at a time, to the horizontal shift register. The first pixel that is transferred corresponds to the upper left part of picture.

Figure 2:
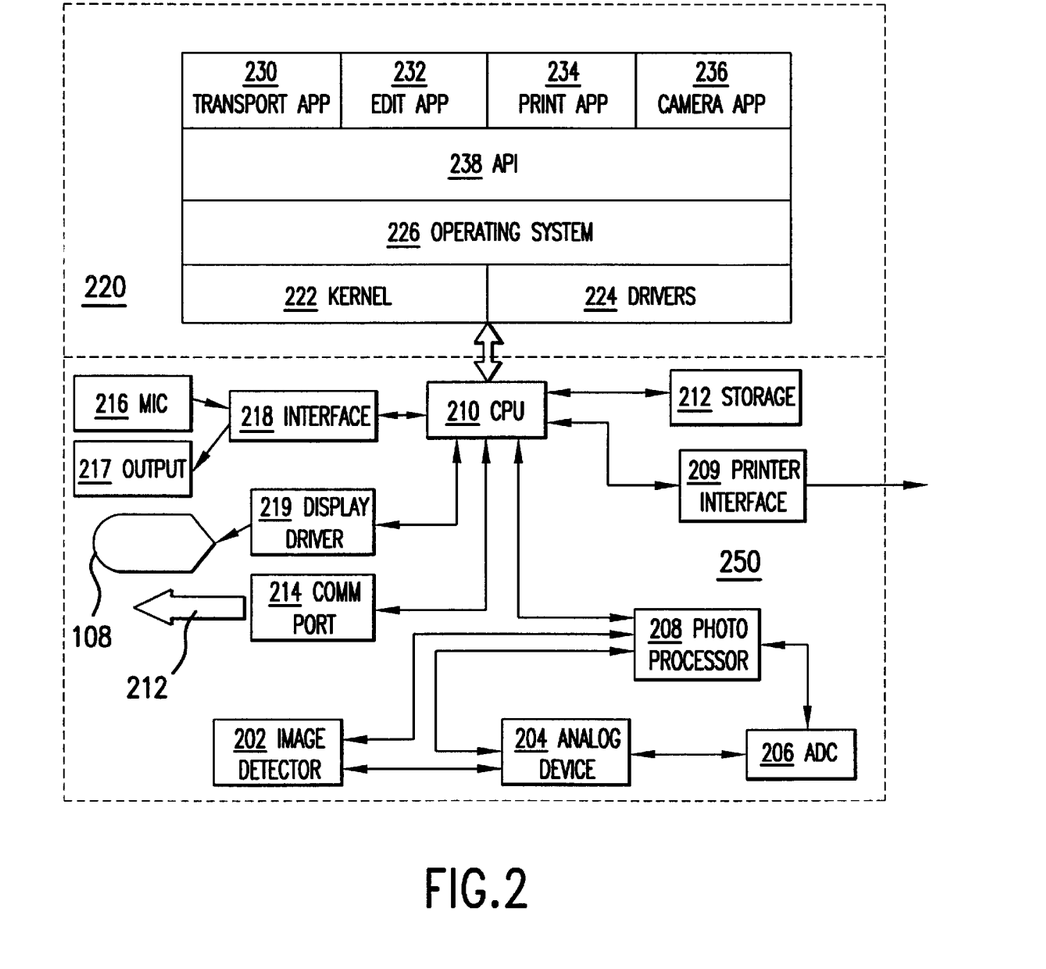
FIG. 2 is a block diagram of selected physical and logical components of a digital camera according to an embodiment.

Thus, serial data is delivered from the sensor to a CPU, or to another hardware device such as photo processor 208 shown in FIG. 2. The CPU or other hardware device "sees" a line of pixel data comprising a Red value, Green value, Red value, Green value, and so forth. The next line of pixel data comprises alternating Green and Blue values. Generally, the lines are 1024 to 3000 pixels long, and the pixel data is delivered by the sensor at about 20 MHz.

Before the CPU or other device may carry out interpolation on the pixel data, the CPU must correct for any errors in each pixel value. For example, the CPU may carry out photo-response non-uniformity (PRNU) correction. PRNU correction generally involves multiplying pixel data that corresponds to a particular color by a correction factor or co-efficient that corrects for non-uniformity of the color filters of the CCD for that particular color. For example, it is known that certain semiconductor materials, from which the sensors are made, are more sensitive to red light than to blue light. PRNU correction adjusts for this variance in sensitivity.

After PRNU correction, a stream of corrected pixel data arrives at the CPU or other hardware device. The CPU may transfer the values to a memory, such as a high-performance SDRAM. The CPU may then begin carrying out interpolation of the missing color information. For example, the CPU may apply bicubic color interpolation using 7-by-7 blocks of memory. To obtain all the values needed to carry out interpolation for a particular pixel, however, the CPU must access 49 addresses in memory. Each access may involve computing an address and an offset value. If the data arrives at 20 MHz, just to keep up with the data stream, the CPU must operate with a memory clock cycle of at least 49×20 MHz, or 980 MHz. This is impractical for currently available SRAMs.

Thus, there is a need for an improved color interpolation approach that has a reduced computational burden.

In the field of digital cameras, there is a particular need for a color interpolation approach that can efficiently carry out color interpolation computations for digital images within the computation horsepower available in the digital camera.

SUMMARY OF THE INVENTION

The foregoing needs and objects, and other needs and objects that will become apparent from the following description, are achieved by the present invention, which comprises, in one aspect, a method of interpolating a first color value associated with a first color and a second color value associated with a second color for use in generating a current pixel of interest among an array of pixels that represent a portion of a digital image, based on a third color value that is associated with a third color. In one embodiment, the method comprises the steps of creating and storing a matrix of first coefficient values that are associated with the first color and are associated with other values of the first color for pixels that surround the current pixel of interest; bitwise shifting each of the first coefficient values by a pre-determined power of 2; creating and storing the first color value by applying the first coefficient values to the other values of the first color for the pixels that surround the current pixel of interest, using a bitwise shift operation; bitwise shifting the first color value by a complement of the pre-determined power of 2; and displaying the digital image using at least the pixel comprising the first color value.

According to one feature, the method further includes the steps of creating and storing a second matrix of second coefficient values that are associated with second other values of the second color for the pixels that surround the current pixel of interest; and bitwise shifting each of the first coefficient values and the second coefficient values by a pre-determined power of 2. In another feature, the method further includes the step of selecting the pre-determined power of 2 from among the values (64, 128, 256).

In another feature, the steps of creating and storing a first matrix of first coefficient values and bitwise shifting each of the first coefficient values by a pre-determined power of 2 comprise the steps of creating and storing a first matrix of first coefficient values that are associated with other values of the first color for the pixels that surround the current pixel of interest and in which each of the first coefficient values is a multiple of a power of 2.

In yet another feature, the steps of creating and storing a first matrix of first coefficient values and bitwise shifting each of the first coefficient values by a pre-determined power of 2 comprise the steps of creating and storing a first matrix of first coefficient values that are associated with other values of the first color for the pixels that surround the current pixel of interest and in which each of the first coefficient values is a multiple of a power of 2 selected from among the range (2, 4, 16, 64, 128, 256).

According to still another feature, the steps of creating and storing the first color value using a bitwise shift operation comprise the steps of adding all non-zero positive first coefficient values that are associated with the first color to create and store a positive sum value; adding all non-zero negative first coefficient values that are associated with the first color to create and store a negative sum value; subtracting the negative sum value from the positive sum value to create and store a net value; and bitwise shifting by $\log_2$ of the net value and storing a result as the first color value.

In another aspect, the invention provides a method of interpolating a first color value associated with a first color and a second color value associated with a second color for use in generating a current pixel of interest among an array of pixels that represents a portion of a digital image, based on a third color value that is associated with a third color. In this aspect, the method comprises the steps of creating and storing a first matrix of first coefficient values that are associated with other values of the first color for pixels that surround the current pixel of interest; creating and storing a second matrix of second coefficient values that are associated with a transformation of the third color value into the second color value; bitwise shifting each of the first coefficient values and the second coefficient values by a pre-determined power of 2; creating and storing the first color value by applying the first coefficient values to the other values by adding all non-zero positive first coefficient values that are associated with the first color to create and store a positive sum value; adding all non-zero negative first coefficient values that are associated with the first color to create and store a negative sum value; subtracting the negative sum value from the positive sum value to create and store a net value; and bitwise shifting by the net value log, and storing a result as the first color value; bitwise shifting the first color value by a complement of the pre-determined power of 2; and displaying the digital image using at least the pixel comprising the third color value and the first color value.

In another aspect, the invention provides an image processing method, for use with an electronic digital camera that forms a digital image using a digital color area sensor, for interpolating a first color value associated with a first color and a second color value associated with a second color for use in generating a current pixel that represents a portion of the digital image, based on a third color value that is associated with a third color. The method may comprise the steps of creating and storing a first matrix of first coefficient values that are associated with other values of the first color for pixels that surround the current pixel, in which each of the first coefficient values is an integer power of 2 selected from the range (−256 . . . 256); creating and storing the first color value by applying the first coefficient values to the other values using a bitwise shift operation; bitwise shifting the first color value by a complement of the pre-determined power of 2; and displaying the digital image in a digital display device of the digital camera using at least the pixel comprising the third color value and the first color value.

Other features and aspects will become apparent from other portions of this document.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for interpolating image information is described. In the following description, for the purposes of explanation, numerous specific details are set forth in order to provide a thorough understanding of the present invention. It will be apparent, however, to one skilled in the art that the present invention may be practiced without these specific details. In other instances, well-known strictures and devices are shown in block diagram form in order to avoid unnecessarily obscuring the present invention.

OVERVIEW OF DIGITAL CAMERA ARCHITECTURE

Figure 1:
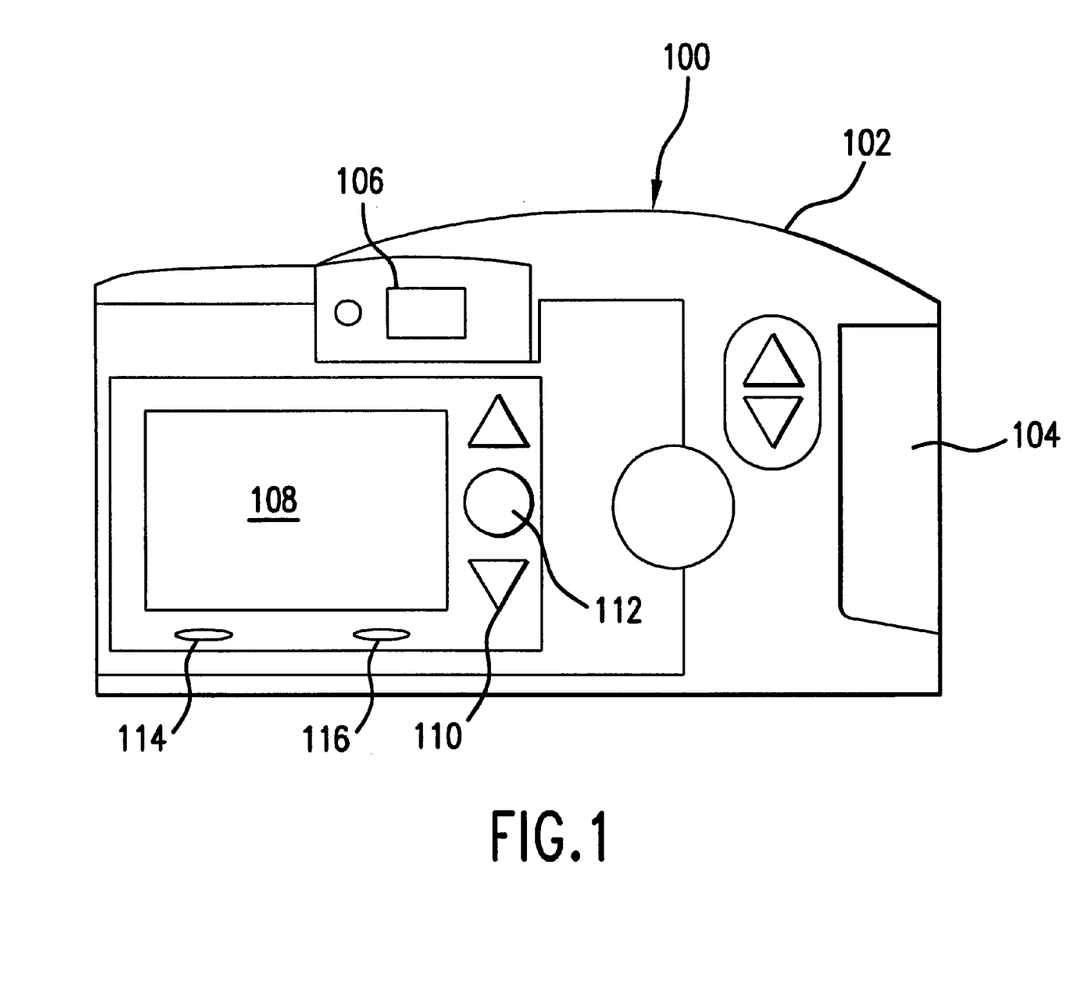
FIG. 1 is a rear elevation view of a personal handheld digital camera.

FIG. 1 is a rear elevation view of a personal handheld digital camera 100. The camera 100 comprises a body 102 generally formed as a rectangular box that can be gripped in the hand using a handgrip 104. A viewfinder 106 is optically coupled to a main lens, so that a user of the camera who wishes to take a picture can look through the viewfinder 106 to line up the shot.

A display device 108 is mounted in the body 102. Stored images and camera settings may be viewed on the display device 108. In one embodiment, the display device 108 is a liquid crystal display (LCD) having a visible area that is approximately 2″ (5 cm) in the diagonal dimension. Selection buttons 110, 112, 114, 116 are mounted in the body 102 adjacent to the display 108. The selection buttons 110–116 are used to signal various logical selections of options, commands, etc. based on the contents of the display 108. Use of the buttons 110–116 in the context of transporting digital images is described further below.

FIG. 2 is a block diagram of selected physical and logical components of the digital camera 100 according to an embodiment. Architecture 200 of the digital camera 100 comprises certain software elements 220 and hardware elements 250. Among the hardware elements 250, an image detector 202 is optically coupled to a main lens of the camera 100. As in a conventional camera, a shutter is interposed between the main lens and the image detector 202. When the shutter is opened, the image detector 202 receives light reflected from a subject and focused by the lens, and an image is formed at the image detector. An example of an image detector 202 is a charge-coupled device (CCD) that comprises an array of detectors or elements.

The image detector 202 produces a plurality of analog image signals that are generally proportional to the amount of light falling on the elements of the CCD. The analog image signals are coupled to an analog device 204, also called an analog chip or photo color device. The analog device 204 receives the signals from the CCD and organizes them into a discrete set of analog signals in a pre-determined amount. The analog device is coupled to an analog-digital converter (ADC) 206 that receives the analog signals from the analog device 204, and converts the analog signals into a plurality of digital signals. In preferred embodiments, the ADC 206 carries out 8-bit or 12-bit analog-to-digital conversion.

The ADC 206 provides its digital outputs to a photo processor 208. In a preferred embodiment, photo processor 208 is implemented as an application specific integrated circuit (ASIC) device that controls operational parameters of the image detector 202 and the analog device 204. The photo processor 208 may also buffer or groom the digital signals received from the ADC 206 to improve or modify image quality.

The photo processor 208 is coupled to a central processing unit (CPU) 210, which in one embodiment is a microprocessor having a 100 MHz clock cycle. The CPU 210 provides central control for other hardware elements 250 of the architecture 200 and executes software elements 220, as described below. The CPU 210 is coupled to one or more storage devices 212. For example, the CPU 210 is coupled to a flash memory card that provides non-volatile storage of digital images or photos taken by the digital camera.

The CPU is also coupled to input/output devices such as a communications port 214. For example, the CPU 210 is coupled to a telephone line 212 through a modem comprised of a coder/decoder (codec) and digital to analog adapter (DAA). Using the modem, the CPU 210 can communicate data over a conventional telephone line to a remote device such as a server, personal computer or workstation, or printer. A modem is merely one example of a device suitable for use as communications port 214. Alternatively, the communications port 214 is an infrared communications device, an Ethernet interface, an ISDN terminal adapter, or another telecommunications device. The specific communication method, protocol or mode used by communications port 214 is not critical.

In the preferred embodiment, CPU 210 also is coupled to a microphone 216 through an appropriate interface 218. Preferably, the microphone 216 is mounted in or on the body 102 of the camera 100. The interface 218 converts analog voice signals received from the microphone 216 into a digital signal representative of the voice signals. The interface 218 enables the CPU 210 to receive, use and manipulate voice commands or voice message information spoken by a user of the digital camera into the microphone 216. The interface 218 preferably is also coupled to an output device 217. The interface can receive digitized audio information, convert it to analog form, pre-amplify the resulting analog signal, and drive the output device 217. In combination, the interface 218 and output device 217 enable the CPU 210 to play digitized audio files or voice messages in an audible way. The output device 217 is a loudspeaker, or an output connector or jack that can be connected to an amplifier and speaker or to a pair of headphones.

The CPU 210 is also coupled to the display device 108 through a display driver 219. The CPU 210 communicates, to the display driver 219, the form and content of information to be displayed on the display device 108. The display driver 219 determines how to display the information and drives the display device 108, for example, by causing the display device 108 to illuminate pixels of an LCD array at appropriate points. In the preferred embodiment, the display device 108 has a touchscreen formed integrally with the display. In this embodiment, the display driver also includes circuitry or firmware for receiving signals from the touchscreen that represent user selection of elements shown in the display. Alternatively, a separate touchscreen driver circuit or chip is used.

In one embodiment, CPU 210 is also coupled to a printer interface 209 that connects to an external image-quality printer. Using printer interface 209, under program control, CPU 210 can command the printer to print a tangible copy of a stored photo. In the preferred embodiment, printer interface 209 communicates data to the printer using infrared light signals. Of course, any other type of printer interface can be used.

In another alternative embodiment, the CPU 210 is coupled to a hot-pluggable external interface. The hot-pluggable external interface enables the digital camera 100 to be connected to a docking station whereby the digital camera may communicate data and images to external computing devices, such as a personal computer.

The CPU 210 executes software elements 220. In the preferred embodiment, the software elements 220 of the architecture 200 are arranged in several logical levels. At the lowest logical level, the CPU 210 executes a kernel 222 and one or more drivers 224, which cooperate to control and supervise the hardware elements 250. For example, the drivers 224 include a driver program that controls and supervises operation of the image detector 202, the analog device 204, and the photo processor 208.

The CPU 210 executes an operating system 226. The operating system 226 is arranged at a logic level higher than the kernel 222 and drivers 224, so that the operating system 226 can use services embodied in the kernel and drivers. In the preferred embodiment, the operating system 226 is the Microsoft Windows CE operating system.

An application programming interface (API) 228 is logically interposed between the operating system 226 and one or more application programs 230–236. The API 228 provides an application programming interface (API) so that the application programs 230–236 may use services of the operating system 226, kernel 222 and drivers 224 by calling functions organized according to high-level abstractions. In this configuration, the application programs 230–236 are insulated from implementation details or intricacies of the operating system 226, kernel 222 and drivers 224. In the preferred embodiment, the API 228 provides functions accessible through function calls that express abstract program behavior and simplify application program development. For example, the API 228 provides functions for retrieving images, storing images, manipulating image elements, receiving or outputting information, and other functions.

In the preferred embodiment, the CPU 210 executes a transport application 230, an edit application 232, a print application 234, and a camera control application 236. Generally, the transport application 230 provides image transport functions, enabling a user of the digital camera 100 to send one or more stored pictures or images from the camera to one or more external addresses. The edit application 232 provides image editing functions, enabling a user of the digital camera 100 to edit, retouch, or alter one or more stored pictures or images while they are stored in the camera. The print application 234 provides image printing functions, enabling a user of the digital camera 100 to print one or more stored images directly from the camera to a printer. The camera control application 236 provides camera control functions, enabling a user of the digital camera 100 to adjust settings of the camera, such as the exposure time, flash on/off, zoom, whether manual focus or autofocus is enabled, red eye removal, flash fill, exposure intensity, etc. In alternate embodiments, other application programs are executed.

In alternative embodiments, the software elements 220 are implemented in the form of firmware or hardwired circuitry that carries out the functions described herein. Implementation in software in this arrangement is not required. Preferably, a user of the digital camera 100 selects and activates one of the application programs 230–236 by choosing an icon representing the desired application program from a display shown on the display device 108.

INTERPOLATION METHOD

Figure 3A:
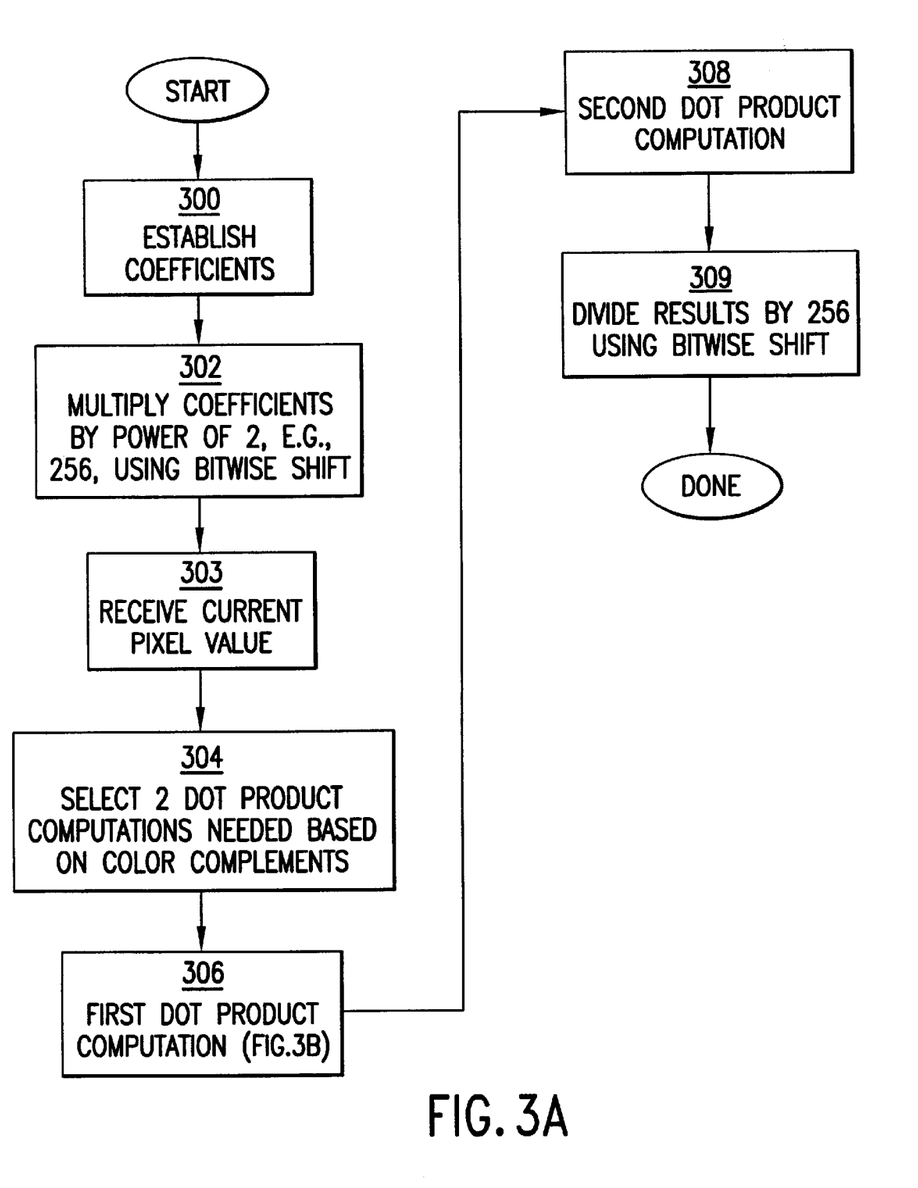
FIG. 3A is a flow diagram of a process of interpolating color information of a pixel based on color information of neighbor pixels.

FIG. 3A is a flow diagram of an improved method of interpolating, for a first pixel of interest that is associated with a first color value, pixel information comprising a second color value and a third color value. FIG. 3A is intended to reflect a process that is repeated or iterated for each pixel ("current pixel" or "pixel of interest") that is received at a processor from a color area sensor, such as a CCD sensor.

Generally, the process provides an improved method of interpolating values of two colors that complement the color represented by the current pixel. For purposes of example only, the discussion of FIG. 3A will assume that a bicubic interpolation approach is used with a 7-by-7 array of neighboring pixels that surround a center pixel of interest. However, a 7-by-7 array is not required, and any number of neighboring pixels may be used in a similar approach.

In block 300, coefficients are established. Block 300 may involve creating and storing, in a digital memory, computer memory or related device, one or more coefficient values that reflect the relative contribution of a particular neighbor pixel to the current pixel. In one embodiment, block 300 is implemented by storing four (4) arrays, each of which is seven (7) elements by seven (7) in size, of coefficient values. Each of the four (4) arrays corresponds to the second and third color values that are needed to be calculated given a current pixel of a particular first color. The reason for using four (4) arrays is explained further below.

In block 302, each of the coefficient values is multiplied by a power of "2." Preferably, the remaining fractional part of each coefficient value is truncated. In the preferred embodiment, the multiplication operation may be carried out by instructing the CPU to carry out a first shift operation. For example, when the power of "2" is the value "256", each coefficient may be shifted left by 8 bits.

Any suitable power of "2" may be selected. An excessively small power of "2" will result in loss of precision in the subsequent calculations. An excessively large power of "2" will result in over-precision which can over-burden the CPU in later operations. Values between "64" and "512" are generally expected to be most suitable.

In one embodiment, the steps of block 300 and block 302 are combined by selecting coefficient values that are integer powers of "2", or the sum of two or more integer powers of "2", such as "16", "–4", "20", etc. The values that are selected are stored in four (4) 7-by-7 arrays using appropriate data structures under control of appropriate software elements.

In block 303, a value of the current pixel is received. In one embodiment, block 303 involves receiving, at a CPU, a value of the next pixel that is output by a color area sensor and after the pixel is subjected to photo-response non-uniformity ("PRNU") processing. PRNU processing is a method of correcting the actual pixel value produced by the sensor to account for variances in color responsiveness of the semiconductor materials that make up the sensor.

In block 304, the process selects two (2) of the four (4) arrays that are necessary to compute pixel values for the two colors that complement the color represented by the current pixel. For example, if the current pixel represents a Blue color value, then the arrays corresponding to Red and Green are selected. Four (4) arrays are required due to slight differences in the patterns of colors of neighboring pixels depending on the color represented by the current pixel. Although there are six (6) cases or permutations of colors that may appear to require computation, in fact only four (4) arrays and four (4) different computations are needed. The six (6) permutations are:

1. When the current pixel is Blue, the process needs to calculate a Green pixel value.
2. When the current pixel is Blue, the process needs to calculate a Red pixel value.
3. When the current pixel is Red, the process needs to calculate a Blue value.
4. When the current pixel is Red, the process needs to calculate a Green value.
5. When the current pixel is Green, the process needs to calculate Red.
6. When the current pixel is Green, the process needs to calculate Blue.

However, the pattern of neighboring pixels, and therefore the pattern of values of coefficients, is the same for case 2 ("at Blue, calculating Red") and case 3 ("at Red, calculating Blue"). Also, the pattern of values of coefficients is the same for case 1 ("at Blue, calculating Green") and 4 ("at Green, calculating Blue") because the pattern of Green neighbors is the same in both cases. Thus, in the above list, only case 1, case 2, case 5, and case 6 are unique.

In block 306, a first dot product computation is carried out. Assume that the current pixel value represents Blue, so that the process has selected operations to calculate Green and Red values in block 304. In this example, block 306 would involve carrying out a dot product computation to determine the Green value. A second dot product computation is separately carried out to determine the Red value, as shown by block 308. The term "dot product" is used because block 306 involves, in effect, multiplying the value of the current pixel value by the value of each element of the "at Blue, computing Green" array that corresponds to a Green neighbor pixel. In embodiments of the present invention, however, CPU multiply operations are not used to carry out the dot product computation.

Figure 3B:
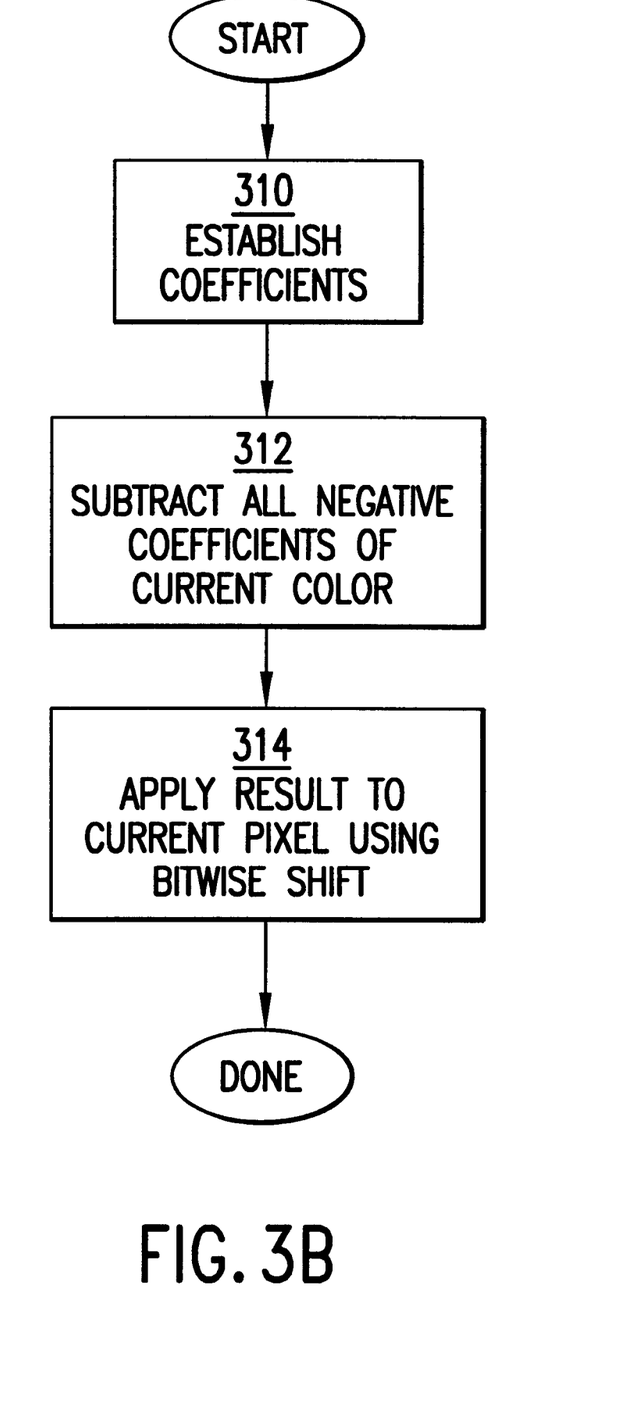
FIG. 3B is a flow diagram of steps in a sub-process of the process of FIG. 3A.

FIG. 3B is a flow diagram of a process that may be used to carry out the dot product computation. In block 310, the process adds all non-zero, positive coefficients in the "at Blue, computing Green" array that correspond to Green neighbor pixels. From this sum, in block 312, the process subtracts all non-zero, negative coefficients from the same array that correspond to Green neighbor pixels. This results in a single value ("net value") that represents the net Green contribution of all Green neighbor pixels.

In block 314, the net value is applied to the current pixel value to result at a scaled color value for the current complementary color that is being calculated. For example, in the case of block 306, the net value is applied to the current pixel value, resulting in a scaled value for the Green pixel value that complements the current pixel. In the preferred embodiment, the net value is applied without using a CPU multiply operation, for example, using a bitwise shift operation. Thus, the current pixel value is shifted by a number of bits equal to the square root of the net value. For example, if the net value is "64", the current pixel value is shifted 8 bits. If the net value is "4", then the current pixel value is shifted "2" bits. In one embodiment, if the net value is less than a pre-determined minimum value, or greater than a pre-determined maximum value, then the net value is set equal to the pre-determined minimum value or maximum value, as appropriate.

In block 309, the resulting shifted current pixel value is then divided by 256, which may be carried out using a second shift operation that is complementary to the first shift operation.

Preferably, all operations are carried out on image data that resides in SDRAM.

Advantageously, no CPU multiply operations are used, greatly speeding the process. No floating-point operations are required, as in past approaches. When the coefficients having values from "0" to "1" are multiplied by 256, and the fractional part is truncated, the coefficients each have an integer value from −256 to +256. Such values may be represented in memory in 8-bit storage locations, unsigned.

Further, in the preferred embodiment, the values of most or many of the coefficients are selected to be either a power of "2", for example, "16" or "64", or two powers of "2" added together, for example, "20" (16+4). Since only shift operations are used, the entire approach can be implemented in integrated circuits or similar hardware devices, ensuring fast processing.

For example, each non-zero pixel contribution value or coefficient is fed to a processing module implemented in hardware. Array elements that have a value of "16" are added together and bit shifted by 4 bits. Array elements that have a value of "20" are added together and bit shifted by 4 bits, added again and bit shifted by 2 bits. To carry out a dot product, all positive terms may be added, all negative terms may be added, and the negative terms are subtracted from the positive terms. The entire dot product may be computed in combinational logic without multiply operations.

As a result, complementary color values may be interpolated in a very fast approach. Currently available digital cameras have CCD sensors that have approximately 2 million pixels. For each pixel, in prior approaches there would be 24–40 multiply operations, and about 30 add operations. This would require many millions of operations to be carried out by a low-end processor in a digital camera, creating a significant image processing bottleneck. The present approach is far faster. For example, through simulation, a past approach has been found to require 10–12 seconds per image based on 2 million pixels. The present approach has been found to take less than 1 second per image.

APPENDIX 1 sets forth an example of a hardware device that implements one embodiment of the invention, expressed in the Verilog hardware simulation language.

GENERAL PURPOSE COMPUTER HARDWARE OVERVIEW

Figure 4:
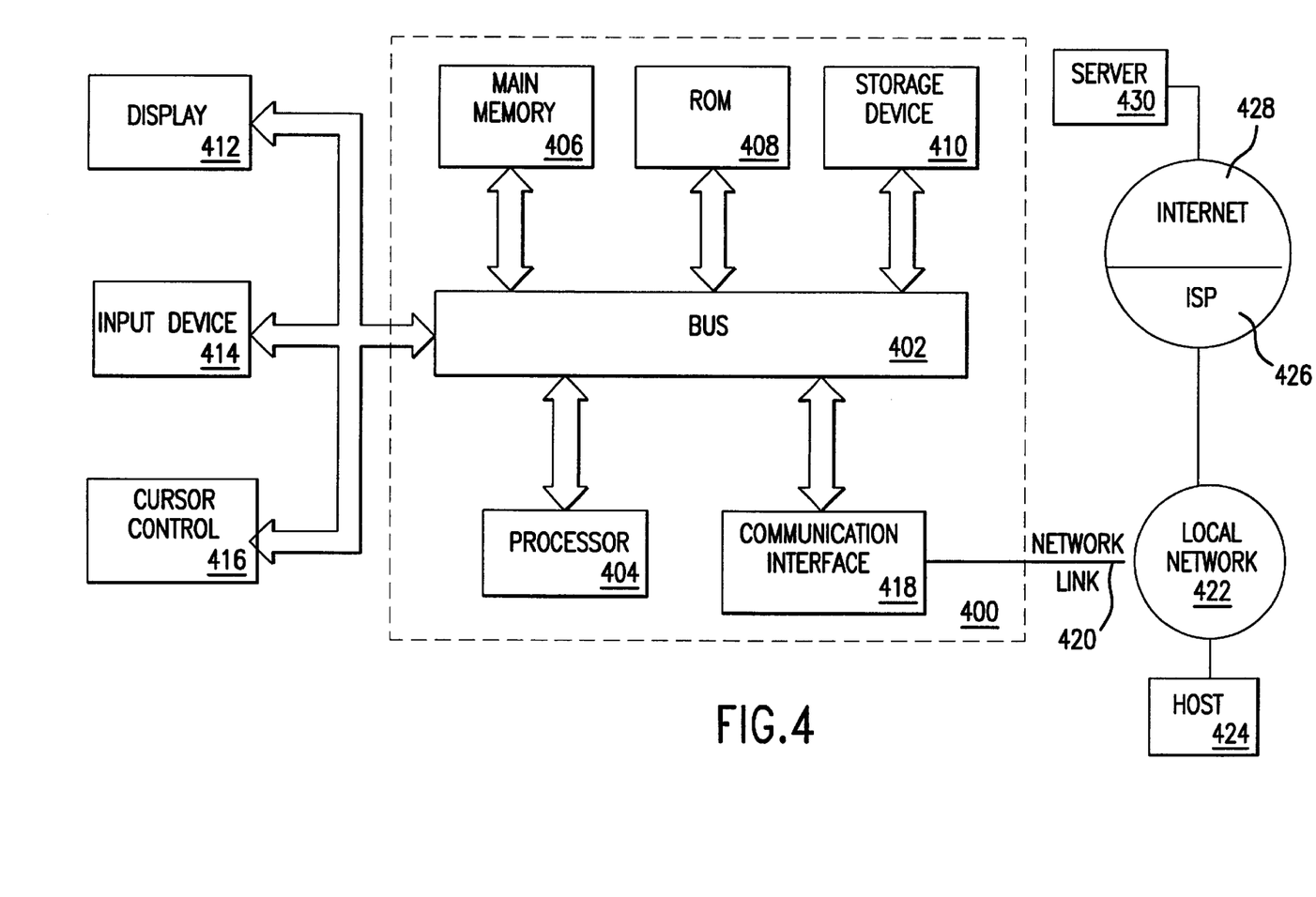
FIG. 4 is a block diagram of a computer system on which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for interpolating image information. According to one embodiment of the invention, interpolating image information is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for interpolating image information as described herein.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An image processing method, for use with an electronic digital camera that forms a digital image using a digital color area sensor, for interpolating a first color value associated with a first color and a second color value associated with a second color for use in generating a current pixel that represents a portion of the digital image, based on a third color value that is associated with a third color, the method comprising the steps:

creating and storing a first matrix of first coefficient values that are associated with other values of the first color for pixels that surround the current pixel, in which each of the first coefficient values is an integer power of 2 selected from the range (−256 . . . 256);

creating and storing the first color value by applying the first coefficient values to the other values using a bitwise shift operation;

bitwise shifting the first color value by a complement of the pre-determined power of 2; and displaying the digital image in a digital display device of the digital camera using at least the pixel comprising the third color value and the first color value.

2. The image processing method recited in claim 1, further including the steps of:

creating and storing a second matrix of second coefficient values that are associated with second other values of the second color for pixels that surround the current pixel; and bitwise shifting each of the first coefficient values and the second coefficient values by a pre-determined power of 2.

3. The image processing method as recited in claim 2, wherein the steps of creating and storing a second matrix of second coefficient values and bitwise shifting each of the second coefficient values by a pre-determined power of 2 comprise the steps of creating and storing a second matrix of second coefficient values that are associated with second other values of the second color for pixels that surround the current pixel and in which each of the second coefficient values is a multiple of a power of 2.

4. The method as recited in claim 1, wherein the steps of creating and storing the first color value comprise the steps of:

adding all non-zero positive first coefficient values that are associated with the first color to create and store a positive sum value;

adding all non-zero negative first coefficient values that are associated with the first color to create and store a negative sum value;

subtracting the negative sum value from the positive sum value to create and store a net value; and bitwise shifting by the net value $\log_2$ and storing a result as the first color value.

5. An image processing method, for use with an electronic digital camera that forms a digital image using a digital color area sensor, for interpolating a first color value associated with a first color and a second color value associated with a second color for use in generating a current pixel that represents a portion of the digital image, based on a third color value that is associated with a third color, the method comprising the steps:

creating and storing a first matrix of first coefficient values that are associated with other values of the first color for pixels that surround the current pixel;

bitwise shifting each of the first coefficient values by 8 bits to result in a plurality of bit-shifted values and replacing each of the first coefficient values with one of the bit-shifted values;

creating and storing the first color value by applying the first coefficient values to the other values of the first color using a bitwise shift operation;

bitwise shifting the first color value by 8 bits; and displaying the digital image in a digital display device of the digital camera using at least the pixel comprising the third color value and the first color value.

6. The method as recited in claim 5, wherein the steps of creating and storing the first color value by applying the first coefficient values to the third color value using a bitwise shift operation comprise the steps of:

adding all non-zero positive first coefficient values that are associated with the first color to create and store a positive sum value;

adding all non-zero negative first coefficient values that are associated with the first color to create and store a negative sum value;

subtracting the negative sum value from the positive sum value to create and store a net value; and bitwise shifting by the net value $\log_2$ and storing a result as the first color value.

* * * * *